(12) United States Patent
Dalsey

(10) Patent No.: US 6,975,303 B2
(45) Date of Patent: Dec. 13, 2005

(54) FOOT OPERATED COMPUTER MOUSE CONTROL DEVICE

(76) Inventor: John F. Dalsey, 77 Emerson Rd., Longmeadow, MA (US) 01106

( * ) Notice: Subject to any disclaimer, the term of this patent is extended or adjusted under 35 U.S.C. 154(b) by 488 days.

(21) Appl. No.: 10/293,021

(22) Filed: Nov. 13, 2002

(65) Prior Publication Data

US 2004/0090419 A1 May 13, 2004

(51) Int. Cl.⁷ .............................................. G09G 5/08
(52) U.S. Cl. .................. 345/163; 345/156; 341/21; 400/475
(58) Field of Search ............................... 345/163, 156; 273/148 B; 341/21; 400/475; 463/36

(56) References Cited

U.S. PATENT DOCUMENTS

| | | | |
|---|---|---|---|
| 4,788,537 A | * 11/1988 | Potiker | 345/165 |
| 4,831,736 A | * 5/1989 | Bryant, Sr. | 33/1 M |
| 5,245,146 A | * 9/1993 | Florence | 200/333 |
| 5,473,345 A | 12/1995 | Dorst | |
| 5,552,807 A | 9/1996 | Hayes et al. | |
| 5,745,055 A | 4/1998 | Redlich et al. | |
| 5,812,114 A | 9/1998 | Loop | |
| 5,838,305 A | 11/1998 | Bookstein | |
| 5,841,426 A | 11/1998 | Dodson et al. | |
| 5,886,685 A | 3/1999 | Best | |
| 5,907,318 A | 5/1999 | Medina | |
| 6,018,334 A | 1/2000 | Eckerberg et al. | |
| 6,091,402 A | 7/2000 | Howell | |
| 6,200,219 B1 | * 3/2001 | Rudell et al. | 463/37 |
| 2002/0126092 A1 | * 9/2002 | Tiphane et al. | 345/163 |

* cited by examiner

Primary Examiner—Patrick N. Edouard
Assistant Examiner—Faranak Fouladi

(57) ABSTRACT

A foot operated mouse control system for controlling a computer mouse having at least one mouse button and a scroll wheel. The control system includes a foot operated mouse controller having a foot support platform. The foot support platform has an upper surface and a lower surface. A retaining device extends from the platform's lower surface, and is sized to receive and capture the mouse. A control wheel is rotationally mounted to a through hole of the platform such that a portion of the control wheel protrudes simultaneously above the platform's upper surface and below the platform's lower surface. When the retaining device captures the mouse the control wheel engages the scroll wheel.

20 Claims, 3 Drawing Sheets

FOOT OPERATED COMPUTER MOUSE CONTROL DEVICE

FIELD OF THE INVENTION

The present invention relates to computer peripheral devices. More specifically, the present invention relates to a foot operated computer mouse control device that engages and controls the scroll wheel portion of a computer mouse.

BACKGROUND OF THE INVENTION

A computer mouse (i.e., mouse) is a small hand-held interactive input device that, when rolled over a flat surface, controls placement of the cursor on a computer's terminal display screen. The palm-sized device has typically a generally oval shape and is usually connected to the computer by a wire that is suggestive of a tail (although wireless mice are currently on the market), hence the name "mouse".

Mice contain at least one button and sometimes as many as three, which have different functions depending on which program is running. Some newer mice also include scroll wheels, which have a growing popularity because it gives the user the ability to scroll through long documents easily.

The mouse is important ergonomically because it frees the user to a large extent from having to use the keyboard. In particular, the mouse is important for graphical user interfaces because one can simply point to options and objects, e.g., an icon, and click a mouse button. Such applications are often called "point-and-click" programs.

There are at least two basic types of mice: electromechanical and optical. The electromechanical mouse has a rubber or metal ball (trackball) protruding from its underside that can roll in all directions. Typically mechanical sensors within the mouse detect the speed and direction the ball is rolling and move the screen pointer accordingly. To provide good traction, an electromechanical mouse is generally used with a flat soft-cushioned mouse pad.

An optical mouse utilizes optical sensors to detect movement of the mouse relative to a surface. The optical mouse has no mechanical moving parts, and may be used on almost any flat surface. They respond more quickly and precisely than electromechanical mice, and are growing in popularity. An optical mouse generally features a scrolling and zooming wheel, and two customizable buttons on opposing sides of the scroll wheel. The buttons facilitate internet navigation and other routine tasks.

The use of a mouse with presently known computers, however, usually requires the hand to leave the keyboard to operate the mouse. This is disruptive of the continuous and rapid flow of information between keyboard and computer. Moreover, people who are disabled in certain ways either cannot, or only with difficulty, can use a keyboard or a hand operated mouse. Some devices have been developed to permit a user's hands to remain on a computer keyboard while utilizing another means to control a cursor or to manipulate icons on a computer screen. Some of these "hands free" devices are foot-operated.

U.S. Pat. No. 5,838,305 to Bookstein discloses one such foot operated device and is herein incorporated by reference in its entirety. The foot-operated control in Bookstein includes a base; a pair of parallel rails mounted on the base; and a rectangular frame slidably or rollably mounted on the rails for translation back and forth along the rails. The frame receives a housing, which is positioned within the frame and slidably or rollably engaged with the frame. The housing is moveable back and forth within the frame in a direction perpendicular to the direction of translation between the frame and the rails. The housing has a top surface and encloses or covers a mouse, to allow the mouse to slidably engage the base, and to receive a foot on the top surface of the housing.

U.S. Pat. No. 5,886,685 to Best discloses another such foot operated device and is herein incorporated by reference in its entirety. Best illustrates a foot operated computer mouse adaptor for operating a conventional computer mouse with a computer user's foot having a cavity into which the computer mouse fits and a means to removably attach the computer user's foot onto the housing. The foot operated computer mouse adaptor allows a computer user to use a conventional computer mouse via the movement of the user's foot on any substantially flat surface.

However, prior art foot operated devices, such as those disclosed in Bookstein or Best, do not include a means for engaging a scroll wheel on a mouse. Scroll wheels have become an increasingly popular feature on mice because they improve searching speed by allowing a user to quickly and continuously move through documents simply by turning the scroll wheel. Thus they provide more efficient scrolling through long documents or web sites, than the traditional software scroll bars typically found on the side of the word processor page or web page. The scroll wheel is often found on the newer optical mice, and is often straddled by a pair of point and click control buttons.

Based on the foregoing, it is the general object of the present invention to provide a foot operated computer mouse control device that overcomes the problems and drawbacks associated with prior art foot operated devices.

SUMMARY OF THE INVENTION

The present invention offers advantages and alternatives over the prior art by providing a foot operated mouse control system for controlling a computer mouse having at least one mouse button and a scroll wheel. The control system includes a foot operated mouse controller having a foot support platform. The foot support platform has an upper surface and a lower surface. A retaining device extends from the platform's lower surface, and is sized to receive and capture the mouse. A control wheel is rotationally mounted to a through hole of the platform such that a portion of the control wheel protrudes simultaneously above the platform's upper surface and below the platform's lower surface. When the retaining device captures the mouse the control wheel engages the scroll wheel.

In an alternative embodiment of the invention the controller of the control system includes at least one mechanical foot-to-button engagement mechanism mounted to the platform for engaging the at least one mouse button. The mechanical foot-to-button engagement mechanism may be a peg, or a pair of pegs, protruding through the platform of the controller to engage the mouse button or buttons.

In another alternative embodiment of the invention the controller of the control system includes at least one platform support extending downwardly from the platform's lower surface a predetermined distance. The platform support may be four legs extending downwardly from the lower surface of the platform.

In another embodiment of the invention the control system also includes a base having a substantially flat surface upon which the controller slides relative thereto. The base may include a raised boarder extending upwardly from the surface to contain the controller within the perimeter of the base.

DETAILED DESCRIPTION OF THE PREFERRED EMBODIMENTS

Figure 1:
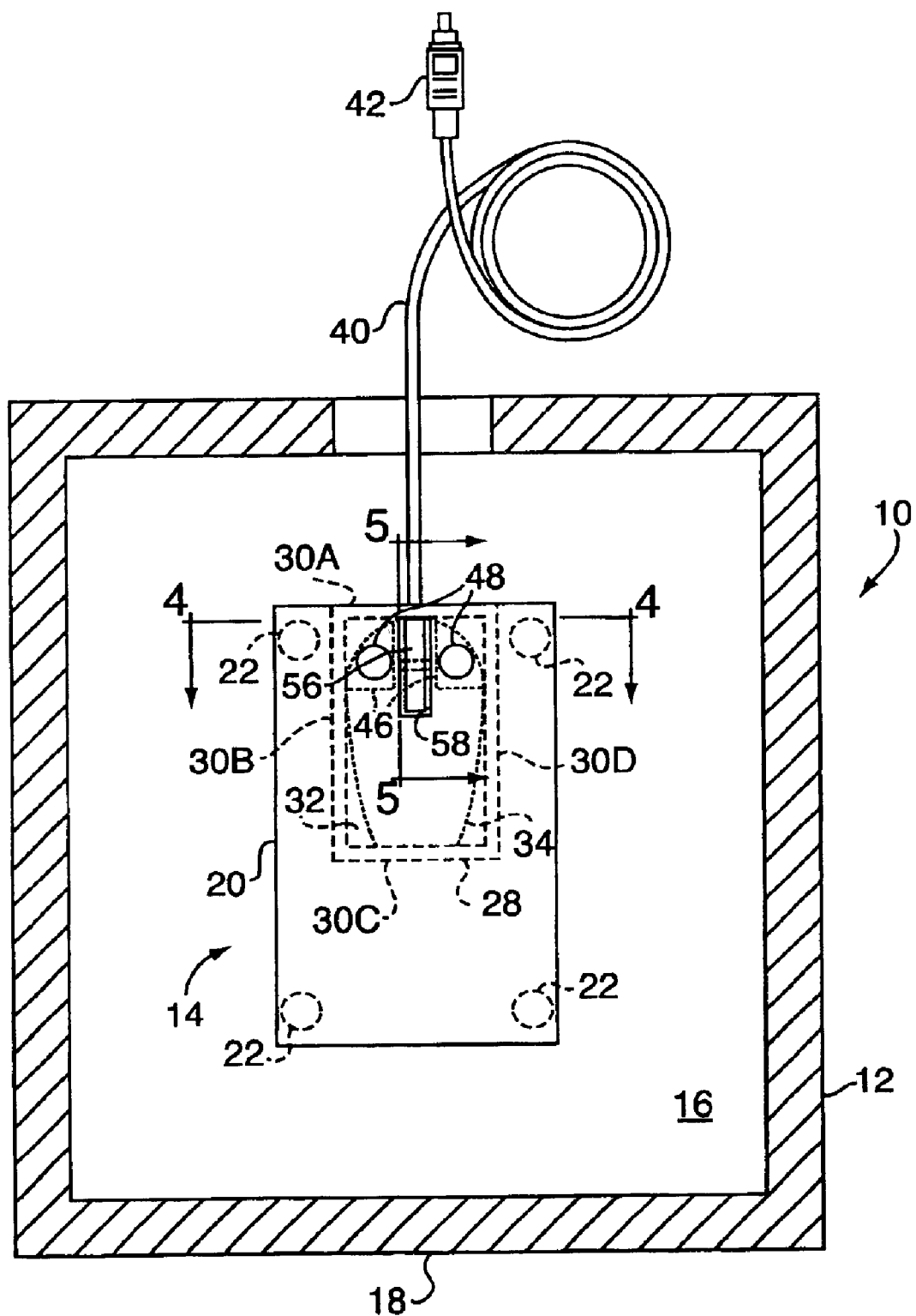
FIG. 1 is a top view of an exemplary embodiment of a foot operated mouse control device in accordance with the present invention.

Referring to FIG. 1, a top view of an exemplary embodiment of foot operated mouse control system is shown generally at 10. The mouse control system 10 provides an input to a computer (not shown), such as controlling the position and movement of the computer's cursor, in response to movement of one or more of an operator's feet. The mouse control system includes a base 12 and a generally rectangular foot operated mouse controller 14, which slidably engages the base. The base 12 has a substantially flat surface 16 upon which the controller 14 slides. The base 12 also includes a raised boarder 18 extending upwardly from the surface 16 to contain the controller within the perimeter of the base.

Figure 2:
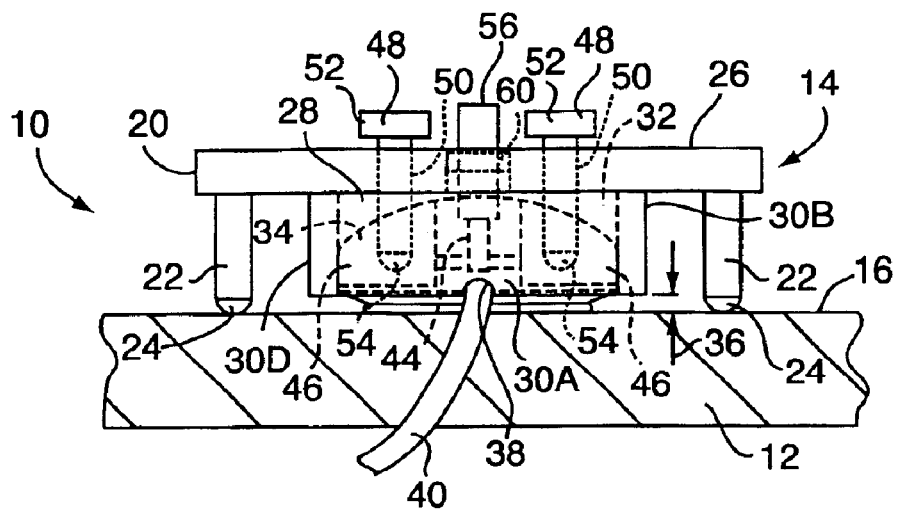
FIG. 2 is a front view of the foot operated mouse control device of FIG. 1.
Figure 3:
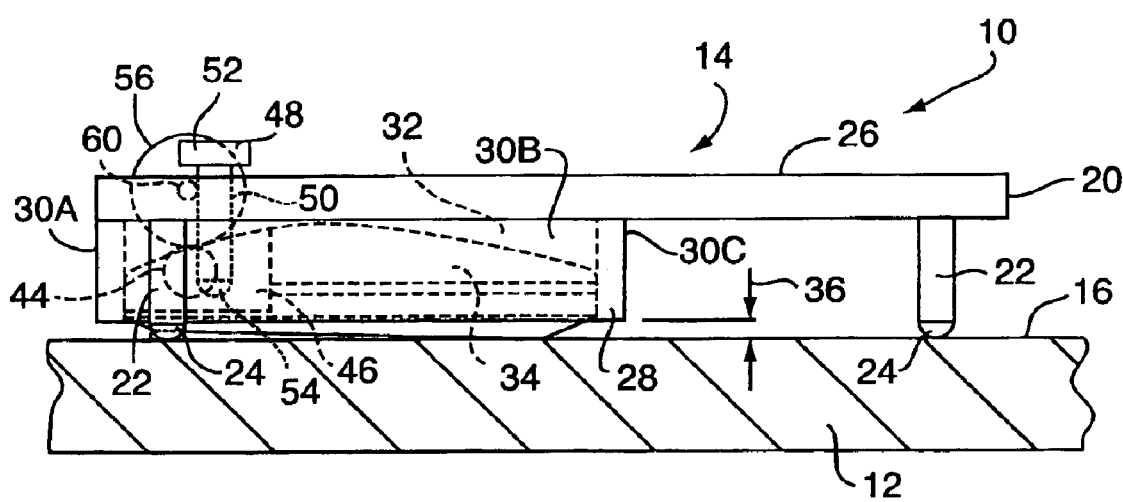
FIG. 3 is a side view of the foot operated mouse control device of FIG. 1.

Referring to FIGS. 2 and 3, front and side views of the foot operated mouse controller 14 are shown respectively. The controller 14 includes a foot support platform 20 with four legs 22. The legs 22 extend from the corners of the platform's lower surface to raise the platform a predetermined distance above the top surface 16 of the base 12. The distal ends of the legs include pads 24 composed of a generally smooth hard substance having a low coefficient of friction, e.g., teflon, to minimize frictional forces as the controller 14 is slid along the surface 16 of the base 12. The shape of the pads 24, e.g. semicircular or arcuate, is also designed to minimize the area of contact between the pads 24 and the base surface 16 in order to facilitate ease of movement of the controller 14. The foot support platform 20 is sized to receive and support at least one of an operator's feet and also includes a generally rough, non-slip upper surface 26, to enable an operator to easily maneuver the platform 20 without the operator's feet tending to slip off of the platform 20.

Though the utilization of base 12 is a preferred embodiment, the controller will also function on many substantially flat hard surfaces, e.g., a wood or linoleum floor. Moreover, one skilled in the art will recognize that other platform supports (rather than the legs 22) may be used to raise the foot support platform, e.g., rims or side walls extending vertically downward and across the length of the platform.

Additionally, the controller 14 and base 12 may be moveable connected together. For example, a system of parallel rails, much like the system employed in the prior art U.S. Pat. No. 5,838,305 to Bookstein discussed herein above, may be utilized to connect the controller 14 to the base 12.

The controller 14 also includes a mouse housing 28. The housing 28 has four side walls 30 A, B, C and D, which extend downward from the lower surface of the platform 20, to define a generally rectangular shaped cavity 32 which is open on the bottom. The cavity 32 is sized to receive, and closely capture, the outer perimeter of a mouse 34.

The height of the side walls 30 of the mouse housing 28 is designed to be slightly shorter than the length of the legs 22 in order to leave a small gap 36 between the bottom of the mouse housing 28 and the surface 16 of the base 12. The gap 36 allows the captured mouse 34 to ride freely on the base surface 16 as an operator's foot is applying pressure to the controller foot support platform 20. The front side wall 30A of the mouse housing 28 contains a notch 38 sized to allow a cable 40 of the mouse 34 to extend through and connect to a computer (not shown), typically via connector 42.

This preferred embodiment illustrates the mouse 34 being captured by four side walls of the mouse housing 28 and the mouse riding freely on the surface 16 due to the open bottom design of the mouse housing. However, one skilled in the art will recognize that other retaining designs may be utilized to capture a mouse. For example, the mouse housing may have a removable strap or partial floor extending across the bottom to hold the mouse up into the cavity, and to simultaneously expose the mouse sensors to the base surface in order to detect movement relative thereto. Additionally the mouse housing may not be completely enclosed on all four sides, but rather may have only partial walls which depend downward to still capture and align the mouse properly. Moreover, the retaining device may be something other than a housing, for example a set of leather straps having fasteners to retain and hold the mouse in the proper position.

Figure 4:
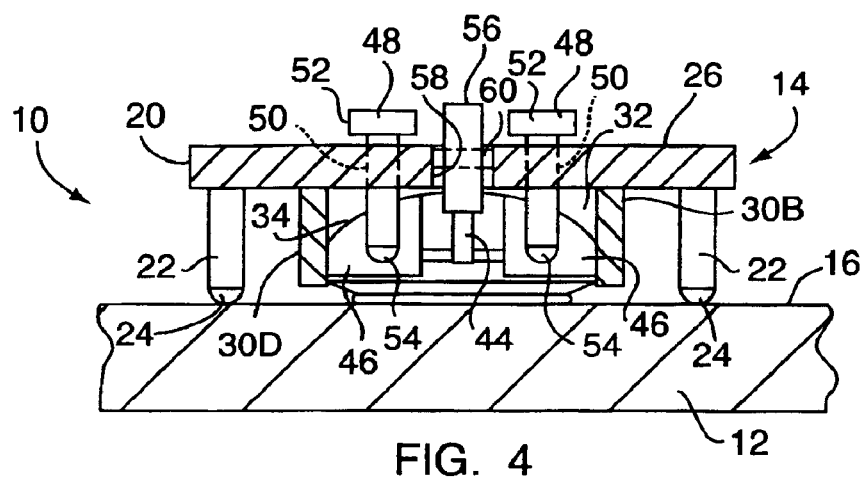
FIG. 4 is a cross sectional view of the foot operated mouse control device taken along the line 4—4 of FIG. 1.
Figure 5:
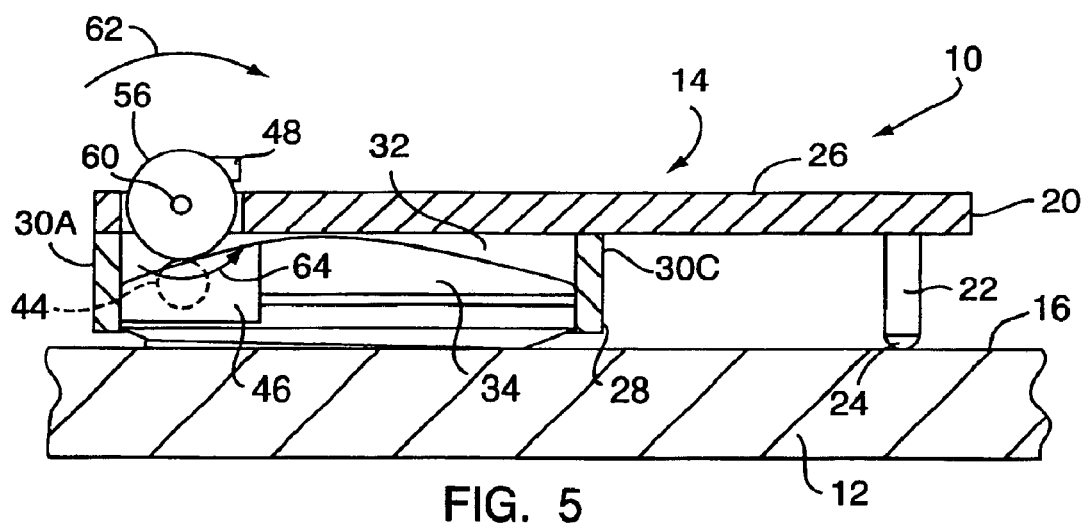
FIG. 5 is a cross sectional view of the foot operated mouse control device taken along the line 5—5 of FIG. 1.

Referring to FIGS. 4 and 5, cross-sectional views taken along lines 4—4 and 5—5 of FIG. 1 are shown respectively. The mouse 34 is a illustrative of a typical optical mouse having a scroll wheel 44, straddled by a pair of mouse buttons 46. The mouse housing 28 aligns the mouse 34 such that the buttons 46 are aligned under a pair of controller pegs 48 protruding through the platform 20 of the controller 14. The pegs 48 have cylindrical shafts 50 and expanded circular heads 52 sized to engage with and operator's foot. The shafts 50 are loosely slip fit through clearance holes in the front portion of the platform 20. The distal ends of the shafts 50 have soft, shock absorbent felt pads 54 (best seen in FIG. 4) glued thereto, which are aligned with and rest on top of each mouse button 46. As the controller 14 is maneuvered over the surface 16 of the base 12, the operator may activate the mouse buttons 46 by pressing on the heads 52 of the controller pegs 48. Additionally, the controller pegs 48 may be held in the depressed position to take advantage of the click and drag features of the mouse. Simultaneously, the felt pads 54 prevent the operator from scratching or otherwise damaging the mouse buttons 46 during operation.

As illustrated in this exemplary embodiment, the controller pegs 48 loosely rest on the top of the mouse buttons 46. However, one skilled in the art would recognize that the pegs 48 may be spring loaded to suspend above the buttons 46 to give a more positive feel to the operator during activation thereof. Additionally, other types of shock absorbent material may be used on the distal ends of the peg's shafts 50, or the peg material itself may be such that shock absorbent pads are not needed.

Additionally, one skilled in the art would also recognize that in lieu of the pegs 48, various other types of mechanical foot-to-button engagement mechanisms may be utilized to activate the mouse buttons 46. For example, a system of levers may be used which operatively connect a control surface above the platform 20 to the buttons 46 of the mouse 34 below the platform. The lever system may be designed to give the operator a greater range of motion than the pegs 50 and to apply less direct pressure to the buttons 46. Additionally, the control surface may be a pair of foot pedals which may be relatively larger than the heads 52 of the pegs 50.

Unlike prior art foot operated computer mouse control devices, a control wheel 56 is located between the pegs 48. The control wheel 56 fits through slot (i.e., through hole) 58 in the platform 20, and is rotationally mounted to the platform via axle 60 such that a portion of the wheel simultaneously protrudes above and below the platform. When the mouse housing 28 captures the mouse 34, it advantageously aligns the control wheel 56 with the scroll wheel 44 such that they are peripherally engaged. Thus, when the control wheel 56 is rotated counterclockwise (as indicated by arrow 62 in FIG. 5), the scroll wheel is rotated clockwise (as indicated by arrow 64), and vise versa. Accordingly, as the controller 14 is maneuvered over the surface 16 of the base 12, an operator may activate the scroll wheel 44 by rotating the control wheel 56 with the operator's foot. Thus enabling the operator to scroll efficiently through large documents or web pages without the use of his hands.

Though this exemplary embodiment shows the control wheel 56 rigidly mounted to the platform 20, one skilled in the art will recognize that the control wheel may also be spring loaded to allow for corresponding spring loading movement of the mouse's scroll wheel 44. Additionally, rather than the wheel being mounted directly to the platform as shown, the wheel may be mounted on mounting pads on the top of the platform. Moreover, the wheel may be more cylindrical in shape in order to be much broader relative to the mouse scroll wheel.

Additionally, one skilled in the art would also recognize that in lieu of the two button optical mouse 34 illustrated herein, the controller 14 may be designed for various other types of mice and mouse configurations. For example, the controller may be designed to capture and control an electromechanical mouse having a scroll wheel, or a mouse with one or three mouse buttons thereon. Moreover, the controller may not be dedicated to a single type of mouse, but rather may designed to control mice having different shapes or different numbers of control buttons.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A foot operated mouse control system for controlling a computer mouse having at least one mouse button and a scroll wheel, the control system including:
   A foot operated mouse controller having:
      a foot support platform having an upper surface and a lower surface,
      a retaining device extending from the platform's lower surface sized to receive and capture the mouse; and
      a control wheel rotationally mounted to a through hole of the platform such that a portion of the control wheel protrudes simultaneously above the platform's upper surface and below the platform's lower surface;
      wherein when the retaining device captures the mouse the control wheel engages the scroll wheel.

2. The foot operated mouse control system of claim 1 wherein the controller includes at least one mechanical foot-to-button engagement mechanism mounted to the platform for engaging the at least one mouse button.

3. The foot operated mouse control system of claim 1 wherein the controller includes at least one platform support extending downwardly from the platform's lower surface a predetermined distance.

4. The foot operated mouse control system of claim 1 comprising:
   a base having a substantially flat surface upon which the controller slides relative thereto.

5. The foot operated mouse control system of claim 1 wherein the retaining device includes a mouse housing extending downwardly from the platform's lower surface to define a cavity which is open at the bottom and sized to receive the mouse.

6. The foot operated mouse control system of claim 2 wherein the at least one mechanical foot-to-button engagement mechanism is at least one controller peg protruding through the platform of the controller to engage the at least one mouse button.

7. The foot operated mouse control system of claim 2 wherein the at least one mechanical foot-to-button engagement mechanism is a pair of controller pegs straddling the control wheel and protruding through the platform of the controller to engage a pair of mouse buttons.

8. The foot operated mouse control system of claim 3 wherein the at least one platform support includes four legs extending downwardly from the lower surface of the platform.

9. The foot operated mouse control system of claim 4 wherein the base comprises a raised boarder extending upwardly from the surface to contain the controller within the perimeter of the base.

10. The foot operated mouse control system of claim 4 wherein a pair of parallel rails slidably connects the base to the controller.

11. A foot operated mouse controller for controlling a computer mouse having at least one mouse button and a scroll wheel, the controller comprising:
   a foot support platform having an upper surface and a lower surface;
   a mouse housing extending downwardly from the platform's lower surface a first predetermined distance to define a cavity sized to receive and capture the mouse; and
   a control wheel rotationally mounted to a through hole of the platform such that a portion of the control wheel protrudes simultaneously above the platform's upper surface and below the platform's lower surface;
   wherein when the mouse housing captures the mouse the control wheel engages the scroll wheel.

12. The foot operated mouse controller of claim 11 comprising at least one mechanical foot-to-button engagement mechanism mounted to the platform for engaging the at least one mouse button.

13. The foot operated mouse controller of claim 11 comprising at least one platform support extending downwardly from the platform's lower surface a second predetermined distance, wherein the second predetermined distance is greater than the first predetermined distance.

14. The foot operated mouse controller of claim 12 wherein the at least one mechanical foot-to-button engagement mechanism is at least one controller peg protruding through the platform of the controller to engage the at least one mouse button.

15. The foot operated mouse controller of claim 12 wherein the at least one mechanical foot-to-button engagement mechanism is a pair of controller pegs straddling the control wheel and protruding through the platform of the controller to engage a pair of mouse buttons.

16. The foot operated mouse controller of claim 13 wherein the at least one platform support includes four legs extending downwardly from the lower surface of the platform.

17. The foot operated mouse controller of claim 11 wherein the control wheel is spring loaded to allow for corresponding spring loading movement of the mouse's scroll wheel.

18. The foot operated mouse controller of claim 15 wherein the pair of controller pegs are spring loaded to suspend the pegs above the mouse buttons.

19. The foot operated mouse controller of claim 16 wherein distal ends of the legs include pads composed of a generally smooth hard substance having a low coefficient of friction to minimize frictional forces as the controller is slid along a surface.

20. The foot operated mouse controller of claim 19 wherein the shape of the pads is arcuate to minimize the area of contact between the pads and the surface.

* * * * *